United States Patent [19]

Winter et al.

[11] Patent Number: 4,714,359

[45] Date of Patent: Dec. 22, 1987

[54] ROLLING BEARING ARRANGEMENT, IN PARTICULAR FOR WORK ROLLS IN HIGH-SPEED ROLLING MILLS

[75] Inventors: Heinrich Winter; Walter Küfner, both of Schweinfurt, Fed. Rep. of Germany

[73] Assignee: SKF GmbH, Schweinfurt, Fed. Rep. of Germany

[21] Appl. No.: 18,623

[22] Filed: Feb. 25, 1987

[30] Foreign Application Priority Data

Mar. 8, 1986 [DE] Fed. Rep. of Germany ....... 3607729

[51] Int. Cl.[4] .............................................. F16C 19/38
[52] U.S. Cl. ...................................... 384/571; 384/558
[58] Field of Search ............... 384/571, 558, 565, 568, 384/569, 551, 585

[56] References Cited

U.S. PATENT DOCUMENTS

| | | |
|---|---|---|
| 3,845,999 | 11/1974 | Zimmer et al. ...................... 384/558 |
| 4,037,892 | 7/1977 | Jahn et al. ............................ 384/558 |
| 4,336,971 | 6/1982 | Reiter .................................. 384/571 |
| 4,522,515 | 6/1985 | Miki et al. ........................... 384/571 |

Primary Examiner—Lenard A. Footland
Attorney, Agent, or Firm—Rosen, Dainow & Jacobs

[57] ABSTRACT

A rolling bearing arrangement for supporting a journal of a work roll has two cylindrical rolling bearings for carrying radial loads and an inclined rolling bearing for carrying axial loads arranged between the cylindrical rolling bearings. The rows of rolling bodies of the inclined rolling bearing have radially inwardly directed lines of load transmission and are displaceable on at least one of the respective raceways in both directions transverse to the rolling direction. The end surfaces of the inner ring of the inclined rolling bearing are slidably displaceable in a substantially radial direction on the opposing end surfaces of the inner rings of the cylindrical rolling bearings. The radial play between the inner ring of the inclined rolling bearing and the journal is greater than the radial play between the inner rings of the cylindrical rolling bearings and the journal.

9 Claims, 2 Drawing Figures

ROLLING BEARING ARRANGEMENT, IN PARTICULAR FOR WORK ROLLS IN HIGH-SPEED ROLLING MILLS

FIELD OF THE INVENTION

The invention relates to a rolling bearing arrangement having an inclined rolling bearing arranged between a pair of cylindrical rolling bearings for rotatably supporting a journal of a work roll.

BACKGROUND OF THE INVENTION

In a known rolling bearing arrangement of the foregoing type disclosed in DE-AS No. 1 625 610, the inclined rolling bearing is formed as a two-sided axially grooved ball bearing, the rings of which are respectively radially and axially fixedly arranged in the bore of a rolling mill stand and on the journal of a work roll. The balls of this axially grooved ball bearing are unevenly loaded along the circumference when the axially grooved ball bearing adopts an inclined position relative to the journal in response to the torque loading in operation resulting from the unavoidable play of the two cylindrical rolling bearings. In addition, at high rotational speeds of the work roll the balls can be moved out of their raceway grooves and radially outwardly displaced as a result of the action of centrifugal forces. In accordance with this known rolling bearing arrangement, the danger exists that the balls of the axially grooved rolling bearing prematurely fail as the result of jamming and overloading.

In accordance with another prior art rolling bearing arrangement disclosed in DE-AS No. 2 247 983, a two-row inclined ball bearing for carrying axial loads in two directions is inserted between two cylindrical rolling bearings. A spacer sleeve is fit between the outer ring of the two cylindrical rolling bearings, which spacer sleeve is arranged radially outside of the outer ring of the inclined ball bearing. The manufacture and assembly of the rolling bearing arrangement is for this reason relatively expensive. Moreover, the two rows of balls of the inclined ball bearing have lines of force transmission which are radially inwardly divergent. For slightly inclined positions of the journal during operation, the balls carry a part of the torque loading of the journal of the work roll and will be radially loaded in places on the circumference. This additional radial loading of the inclined ball bearing is particularly disadvantageous when it is incorporated in a rolling bearing arrangement for the journal of a fast-running, highly loaded work roll in a rolling mill.

BRIEF SUMMARY OF THE INVENTION

The object of the invention is to provide a rolling bearing arrangement for supporting the work rolls in a high-speed rolling mill which is capable of withstanding extremely high radial and axial loads when small inclined positions of the journal of the work roll relative to the bore of the rolling mill stand occur during operation. The rolling bearing arrangement should moreover be compactly constructed and for roll changing the rolling mill stand together with its associated rolling bearing should be easily removed from the journal.

With the rolling bearing arrangement according to the invention, small-angled inclined positions of the journal in the bore of the rolling mill stand, which are due to the unavoidable radial play of the two cylindrical rolling bearings, lead to a relatively small additional loading in the inclined rolling bearing. The inner ring of the inclined rolling bearing can be slidably displaced after overcoming sliding friction on the axially supported end surface of the adjacent inner ring. In addition, a small displacement of the rolling bodies on the raceway of the outer ring and/or inner ring transverse to the rolling direction is possible. One of the two raceways for each row of rolling bodies has no lateral guiding lips, whereby the rolling bodies perform the lateral shifting on this raceway without hindrance.

Because the inner ring of the inclined rolling bearing between the inner ring of the two cylindrical rolling bearings is slidably displaceable in the radial direction, the inclined rolling bearing carries only axial forces during operation.

In accordance with the invention, the journal of the work roll can incline within wide limits without the two rows of rolling bodies of the inclined rolling bearing jamming between their raceways.

Further in accordance with the invention, all of the rolling bearings of the rolling bearing arrangement can be easily removed with the rolling mill stand from the journal of the work roll when the inner rings of the cylindrical rolling bearings have been worn away by sliding abrasion during operation. The inner ring of the cylindrical rolling bearing closest to the work roll can then be pushed axially outwardly without hindrance over the radially inwardly offset portion of the journal. In addition, all of the rolling bearings have a uniform bore, so that rolling bearings with conventional dimensions can be employed.

In accordance with a further feature of the invention, the inner rings of all the rolling bearings of the rolling bearing arrangement can be installed and adjusted with small prestress or with small mutual axial play by means of a single shaft nut arranged on the end of the journal.

BRIEF DESCRIPTION OF THE DRAWINGS

The preferred embodiments of the invention will be described in detail hereinafter with reference to the drawings, wherein.

DETAILED DESCRIPTION OF THE PREFERRED EMBODIMENTS

Figure 1:
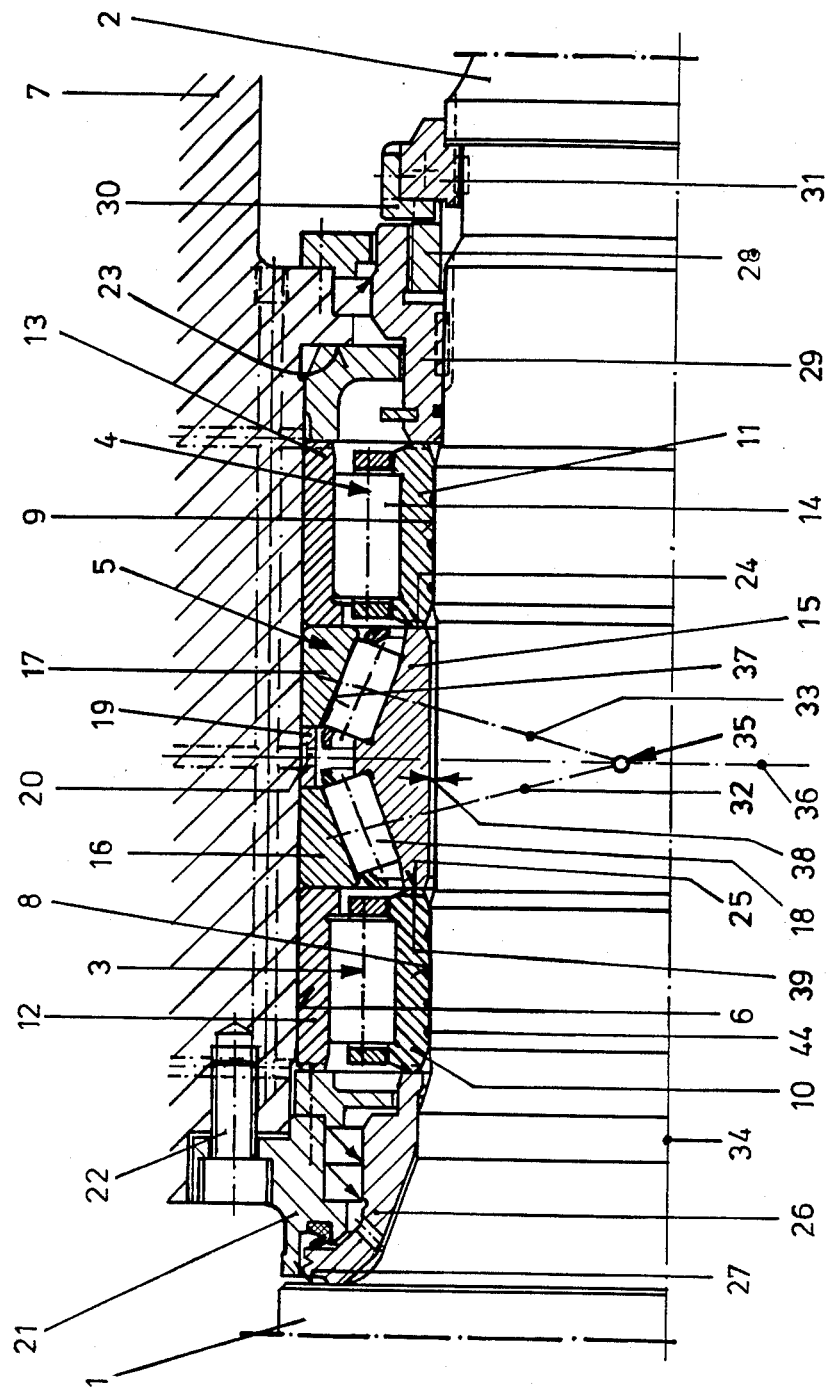
FIG. 1 is a partial longitudinal sectional view of a rolling bearing arrangement on the fixed bearing side of the work roll of a rolling mill.

The reference numeral 1 in FIG. 1 denotes a work roll of a rolling mill for hot strip rolling and 2 denotes a journal arranged on the fixed bearing and control end of the work roll 1. On the opposite movable bearing and driving end, the work roll is supported in a conventional manner in a four-row tapered rolling bearing (not shown).

The journal 2 is supported in the cylindrical bore 6 of a rolling mill stand 7 by means of two cylindrical rolling bearings 3, 4 for carrying radial loads and one two-row inclined rolling bearing 5 arranged therebetween for carrying axial loads in both directions.

The cylindrical rolling bearings 3, 4 have respective inner rings 10, 11 with cylindrical inner raceways fixed on respective seating surfaces 8, 9 of journal 2, respective outer rings 12, 13 with cylindrical outer raceways fixed in the bore 6 of rolling mill stand 7, and respective rows of cylindrical rolling bodies 14 which roll between the respective inner and outer raceways.

The inclined rolling bearing 5 comprises an inner ring 15 having two inner raceways, two outers ring 16, 17 having respective outer raceways, and two rows of tapered rolling bodies 18 arranged therebetween. Each row of rolling bodies 18 rolls between an inner raceway of inner ring 15 and an outer raceway of one of the two outer rings 16, 17.

In the present case an additional spacing ring 19 is arranged between the two outer rings 16, 17 of the inclined rolling bearing 5. The spacing ring 19 has a radial throughgoing lubrication hole 20. The supply of lubricant (e.g. grease or oil) takes place by way of lubrication channels in rolling mill stand 7 and by way of lubrication hole 20 into the inside of inclined rolling bearing 5.

The outer rings 12, 13 of both cylindrical rolling bearings 3, 4 and the outer rings 16, 17 and the spacing ring 19 of the inclined rolling bearing 5 can be axially pressed and fixed by force-fit in the bore 6 of the rolling mill stand 7. Therefore, no axial assembly forces are transmitted by the two rows of rolling bodies 18 of inclined rolling bearing 5.

With the help of inner cover plate 21, which is fastened to a end end of rolling mill stand 7 by bolts 22, the outer rings 12, 13, 16, 17 and the spacing ring 19 arranged in series are tightened and axially fixed against a stationary shoulder 23 in the bore 6 of rolling mill stand 7.

The inner ring 15 has a substantially radial end surface 24 on each end, each end surface being axially supported by an opposing end surface 25 of the respective inner ring of adjacent cylindrical rolling bearings 3, 4.

The inner rings 10, 11 of both cylindrical rolling bearings 3, 4 and the inner ring 15 of inclined rolling bearing 5 are arranged in series on journal 2. The inner ring 10 of the cylindrical rolling bearing 3 is axially supported by a shoulder ring 26 against a radial offset 27 of work roll 1.

On the outer end of journal 2, a shaft nut 28 is threaded into the bore of an end ring 29. The end ring 29 is secured against rotation on the journal 2 by means of a key, in conventional manner, as illustrated in FIG. 1. This shaft nut 28 is turned by means of the adjusting ring 30 to adjust a small axial play (positioning play) of the inner rings 10, 11 relative to the inner ring 15, whereby the shaft nut 28 is pressed axially outwardly against a two-piece thrust ring 31 supported on a shoulder of the journal 2 and the end ring 29 on the journal 2 is moved axially inwardly against inner ring 11. After this axial adjustment of the inner rings 10, 11 and 15, the adjusting ring 30 is secured in its rotational position by a bolt (not shown) which passes through the adjusting ring 30 and is screwed into a threaded hole in the thrust ring 31. The thrust ring 31 is secured against rotation by means of a key on journal 2 as illustrated.

The two rows of rolling bodies 14 of inclined rolling bearing 5 have radially inwardly directed lines of load transmission 32, 33 which intersect. In this case the lines 32, 33 intersect in the vicinity of center axis 34 of journal 2 at points 35 which lie in a radial central plane 36 between the two rows of inclined rolling bearing 5.

The conical outer raceways 37 of the two outer rings 16, 17 of inclined rolling bearing 5 have no lateral guiding lips, so that the rolling bodies 18 on this raceway 37 can be displaced transverse to the rolling direction without hindrance on both sides for small-angled inclined positions of the inner ring 15.

The inner ring 15 of the inclined rolling bearing 5 has a bore which encompasses journal 2 with a radial play 38, which is greater than the radial play of each of the cylindrical rolling bearings 3, 4.

In this case the inner rings 10, 11 radially fixed on the cylindrical seating surfaces 8, 9 of journal 2 and the inner ring 15 of inclined rolling bearing 5 have bores of substantially equal diameters, and the radial play 38 of inner ring 15 is formed by a radially inwardly offset cylindrical portion of journal 2 located between seating surfaces 8, 9 and the bore of inner ring 15.

Because the inner rings 10, 11 and 15 have a small mutual axial play therebetween, the end surfaces 24 of inner ring 15 can slide somewhat on the opposing end surfaces 25 of inner rings 10, 11, which receive no axial loads, in the event that small radial displacements occur within the radial play of the cylindrical rolling bearings 3, 4. The inner ring 15 is therefore separately slidably displaceable on the axially unloaded end surfaces 25 of the inner rings 10, 11 in a substantially radial direction.

The end surfaces 25 of inner rings 10 and 11 have a respective plurality of circumferentially distributed, radially throughgoing lubrication grooves 39 which effect an even distribution of the lubricant supplied by way of the lubrication hole 20 to the end surfaces 24 which slide on end surfaces 25.

In the foregoing preferred embodiment the end surfaces 24 of inner ring 15, which slide on the end surfaces of inner rings 10, 11, are finished by polishing, so that each end surface 24 has a somewhat convex shape in the radial direction and the lubricant can infiltrate relatively easily between opposing end surfaces 24 and 25.

Figure 2:
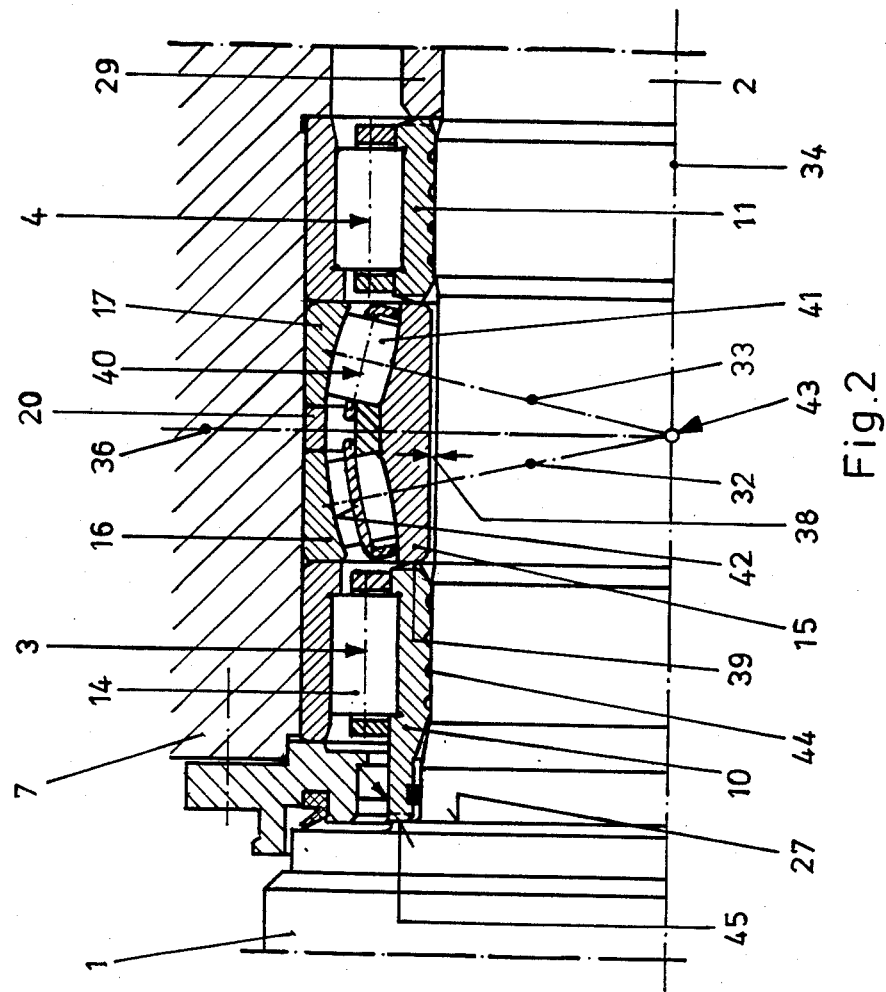
FIG. 2 is a partial longitudinal sectional view of a modified rolling bearing arrangement on the fixed bearing side of the work roll of a rolling mill.

In FIG. 2 another preferred embodiment of the rolling bearing arrangement according to the invention is shown. This preferred embodiment is similar in construction to the rolling bearing arrangement of FIG. 1, having two cylindrical rolling bearings 3, 4 for carrying radial loads and an inclined rolling bearing 40 arranged therebetween for carrying axial loads.

In this embodiment the inclined rolling bearing 40 is constructed as a self-aligning rolling bearing having two rows of barrel-shaped rolling bodies 41. The inclined rolling bearing 40 has a one-piece inner ring 15 and two outer rings 16, 17, each outer ring having a spherical concave outer raceway 42 for receiving a respective row of rolling bodies 41.

The radially inwardly directed lines of load transmission 32, 33 of the two rows of rolling bodies 41 intersect at a common point 43 at the center of a circle (not shown) having a radius of curvature equal to that of the spherical outer raceways 42. This center point 43 lies on the central axis 34 of journal 2 as well as in the radial central plane 36 of the inclined rolling bearing 40.

The rolling bodies 41 of the inclined rolling bearing 40 are arranged for displacement on the outer raceways 42 in both directions transverse to the rolling direction. The inner ring 15 of the inclined rolling bearing 40 can for this reason adopt a somewhat inclined position, by rotation about center point 43, without jamming of the rolling bodies 41.

During this inclined positioning the end surfaces 24 of the inner ring 15 slide on the opposing end surfaces 25 of inner rings 10, 11 in a substantially radial direction.

The ends of inner ring 15 carrying the end surfaces 24 are radially displaced somewhat relative to the journal 2. Moreover, the inner ring 15 does not come into contact with the journal 2, because there is a radial play between the inner ring 15 and the journal 2 which is greater than the radial play between the inner rings of the cylindrical rolling bearings 3, 4 and the journal 2.

Each inner ring 10, 11 has a shallow helical lubrication groove 44 formed in its cylindrical bore. The inner ring 10 of cylindrical rolling bearing 3 is supported on a radial offset 27 of the work roll 1 by means of an inwardly extending, integrally formed projection 45.

The above-described preferred embodiments can be modified without departing from the scope of the invention. For example, the inner ring of the two-row inclined rolling bearing can be divided so that the rolling bodies of both rows respectively roll along the inner raceway of a separate inner ring.

At least one of the two cylindrical rolling bearings can be constructed to have more than one row. The respective outer ring and/or the respective inner ring of such a cylindrical rolling bearing can likewise be divided so that the separate rows of cylindrical rollers respectively roll against a separate outer ring and/or inner ring.

The foregoing description of the preferred embodiments is presented for illustrative purposes only and is not intended to limit the scope of the invention as defined in the appended claims. Modifications may be readily effected by one having ordinary skill in the art without departing from the spirit and scope of the invention concept herein disclosed.

What is claimed is:

1. In a rolling bearing arrangement for supporting a journal of a work roll or the like by means of first and second cylindrical rolling bearings for carrying radial loads, each cylindrical rolling bearing having an outer ring means, an inner ring means and a first row of rolling bodies arranged therebetween, and by means of an inclined rolling bearing arranged between said first and second cylindrical rolling bearings for carrying axial loads in both axial directions, said inclined rolling bearing having an outer ring means, an inner ring means, and first and second rows of rolling bodies arranged therebetween, said outer ring means and said inner ring means of said inclined rolling bearing each having first and second raceways on which said first and second rows of rolling bodies respectively roll, whereby said outer ring means of said cylindrical and inclined rolling bearings are axially and radially fixedly arranged in series in a common bore of a rolling mill stand, said inner ring means of said cylindrical rolling bearings are axially and radially fixedly arranged on said journal, and said inner ring means of said inclined rolling bearing has first and second radial end surfaces which are respectively axially supported on opposing end surfaces of said inner ring means of said respective cylindrical rolling bearings, the improvement wherein:

(a) said first and second rows of rolling bodies of said inclined rolling bearing have radially inwardly directed lines of load transmission which intersect;

(b) said rolling bodies of said inclined rolling bearing are arranged to be displaced in both directions transverse to the rolling direction on at least one of the respective raceways;

(c) said end surfaces of said inner ring means of said inclined rolling bearing are arranged to be slidably displaced in a substantially radial direction on said respective opposing end surfaces of said inner ring means of said cylindrical rolling bearings; and (d) a radial play is provided between said inner ring means of said inclined rolling bearing and said journal which is greater than the radial play between said inner ring means of said respective cylindrical rolling bearings and said journal.

2. The rolling bearing arrangement as defined in claim 1, wherein said lines of load transmission of said respective rows of rolling bodies of said inclined rolling bearing intersect at points located axially between said respective rows in the vicinity of a central axis of said journal.

3. The rolling bearing arrangement as defined in claim 1, wherein said journal has first and second cylindrical seating surfaces and a radially inwardly offset portion arranged therebetween, said inner ring means of said first and second cylindrical rolling bearings and said inner ring means of said inclined rolling bearing have bores of substantially equal diameters, said inner ring means of said first and second cylindrical rolling bearing being respectively radially fixedly arranged on said first and second cylindrical seating surfaces of said journal, and said inner ring means of said inclined rolling bearing and said radially inwardly offset portion of said journal having a radial play therebetween.

4. The rolling bearing arrangement as defined in claim 1, wherein said inner ring means of said cylindrical rolling bearings and said inclined rolling bearing are arranged in series and are axially adjustably arranged together against an offset of said work roll by means of a shaft nut arranged on an outer end of said journal.

5. The rolling bearing arrangement as defined in claim 1, wherein said inner ring means of said inclined rolling bearing is formed as one piece.

6. The rolling bearing arrangement as defined in claim 1, wherein the rolling bodies of said inclined rolling bearing have tapered rolling surfaces.

7. The rolling bearing arrangement as defined in claim 1, wherein the rolling bodies of said inclined rolling bearing have substantially spherical convex rolling surfaces, and said outer ring means of said inclined rolling bearing has first and second substantially spherical concave raceways having a common center of curvature located on a central axis of said journal.

8. The rolling bearing arrangement as defined in claim 1, wherein at least one of said opposing end surfaces of said inner ring means of said inclined rolling bearing and said first cylindrical rolling bearing and at least one of said opposing end surfaces of said inner ring means of said inclined rolling bearing and said second cylindrical rolling bearing have circumferentially distributed, radially throughgoing lubrication grooves.

9. The rolling bearing arrangement as defined in claim 1, wherein at least one of said opposing end surfaces of said inner ring means of said inclined rolling bearing and said first cylindrical rolling bearing and at least one of said opposing end surfaces of said inner ring means of said inclined rolling bearing and said second cylindrical rolling bearing is convex on its periphery in a radial direction.

* * * * *